United States Patent
Koutrika et al.

(10) Patent No.: US 10,891,334 B2
(45) Date of Patent: Jan. 12, 2021

(54) LEARNING GRAPH

(71) Applicant: Hewlett-Packard Development Company, L.P., Spring, TX (US)

(72) Inventors: Georgia Koutrika, Santa Clara, CA (US); Lei Liu, Palo Alto, CA (US); Jerry J. Liu, Cupertino, CA (US); Steven J. Simske, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 913 days.

(21) Appl. No.: 15/101,879

(22) PCT Filed: Dec. 29, 2013

(86) PCT No.: PCT/US2013/078174
§ 371 (c)(1),
(2) Date: Jun. 3, 2016

(87) PCT Pub. No.: WO2015/099810
PCT Pub. Date: Jul. 2, 2015

(65) Prior Publication Data
US 2017/0039297 A1 Feb. 9, 2017

(51) Int. Cl.
*G06F 16/90* (2019.01)
*G06F 16/93* (2019.01)
(Continued)

(52) U.S. Cl.
CPC .......... *G06F 16/9024* (2019.01); *G06F 16/93* (2019.01); *G06F 40/10* (2020.01); *G06N 20/00* (2019.01)

(58) Field of Classification Search
CPC ...... G06F 16/9024; G06F 16/93; G06F 17/21; G06N 20/00
See application file for complete search history.

(56) References Cited

U.S. PATENT DOCUMENTS

| | | | |
|---|---|---|---|
| 7,927,105 B2 | 4/2011 | Griffin et al. | |
| 2002/0042793 A1* | 4/2002 | Choi | G06F 16/335 |

(Continued)

FOREIGN PATENT DOCUMENTS

| | | |
|---|---|---|
| IN | 02913DE2008 | 7/2010 |
| WO | WO-2011121930 A1 | 10/2011 |

OTHER PUBLICATIONS

Xu et al. (Wei Xu, Xin Liu, Yihong Gong, "Document Clustering Based on Non-negative Matrix Factorization", Proceedings of the 26th annual international ACM SIGIR conference, 2003, pp. 267-273 (Year: 2003).*

(Continued)

*Primary Examiner* — Eric Nilsson
*Assistant Examiner* — Urmana Islam
(74) *Attorney, Agent, or Firm* — Austin Rapp

(57) ABSTRACT

A learning graph is generated for documents according to a sequencing approach. The learning graph includes nodes corresponding to the documents and edges. Each edge connects two of the nodes and indicates a sequencing relationship between two of the documents to which the two of the nodes correspond that specifies an order in which the two of the documents are to be reviewed in satisfaction of the learning goal. The learning graph is a directed graph specifying a learning path through the documents to achieve a learning goal in relation to a subject.

10 Claims, 8 Drawing Sheets

(51) Int. Cl.
*G06F 40/10* (2020.01)
*G06N 20/00* (2019.01)
*G06F 16/901* (2019.01)

(56) References Cited

U.S. PATENT DOCUMENTS

| | | |
|---|---|---|
| 2002/0087416 A1 | 7/2002 | Knutson |
| 2003/0115188 A1 | 6/2003 | Srinivasa et al. |
| 2006/0047441 A1* | 3/2006 | Homayouni ........... G16B 50/00 |
| | | 702/19 |
| 2006/0075017 A1 | 4/2006 | Lee et al. |
| 2007/0122790 A1 | 5/2007 | Sperle et al. |
| 2009/0125503 A1* | 5/2009 | He ..................... G06F 16/355 |
| 2010/0153299 A1* | 6/2010 | Keenan ................ G06Q 40/06 |
| | | 705/36 R |
| 2011/0039249 A1 | 2/2011 | Packard et al. |
| 2011/0131536 A1* | 6/2011 | Peng ................. G06F 16/9535 |
| | | 715/848 |
| 2011/0177480 A1 | 7/2011 | Menon et al. |
| 2012/0296891 A1* | 11/2012 | Rangan ............... G06F 16/3347 |
| | | 707/722 |

OTHER PUBLICATIONS

"NetDimensions Enterprise Knowledge Platform", Sep. 9, 2011.

\* cited by examiner

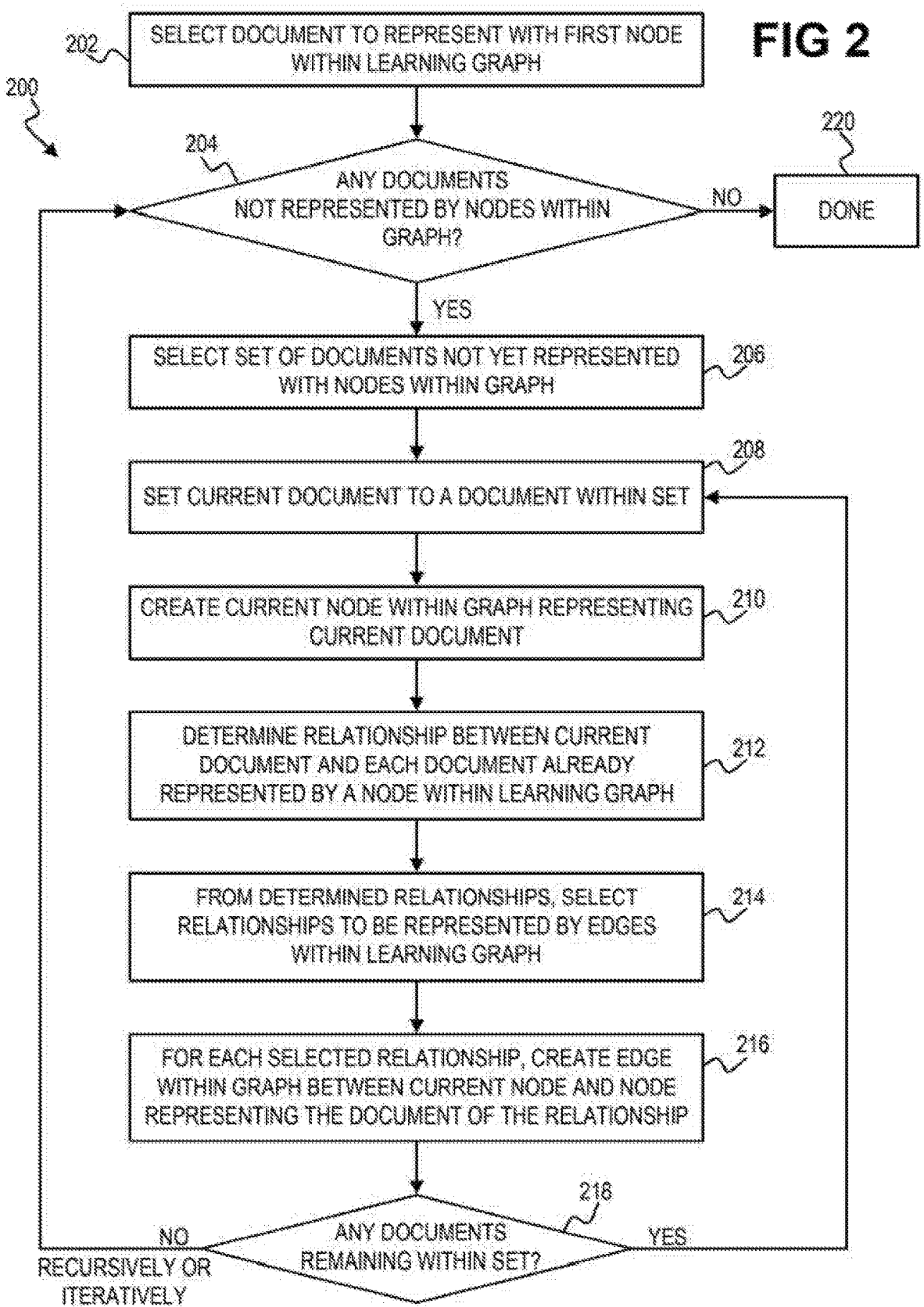

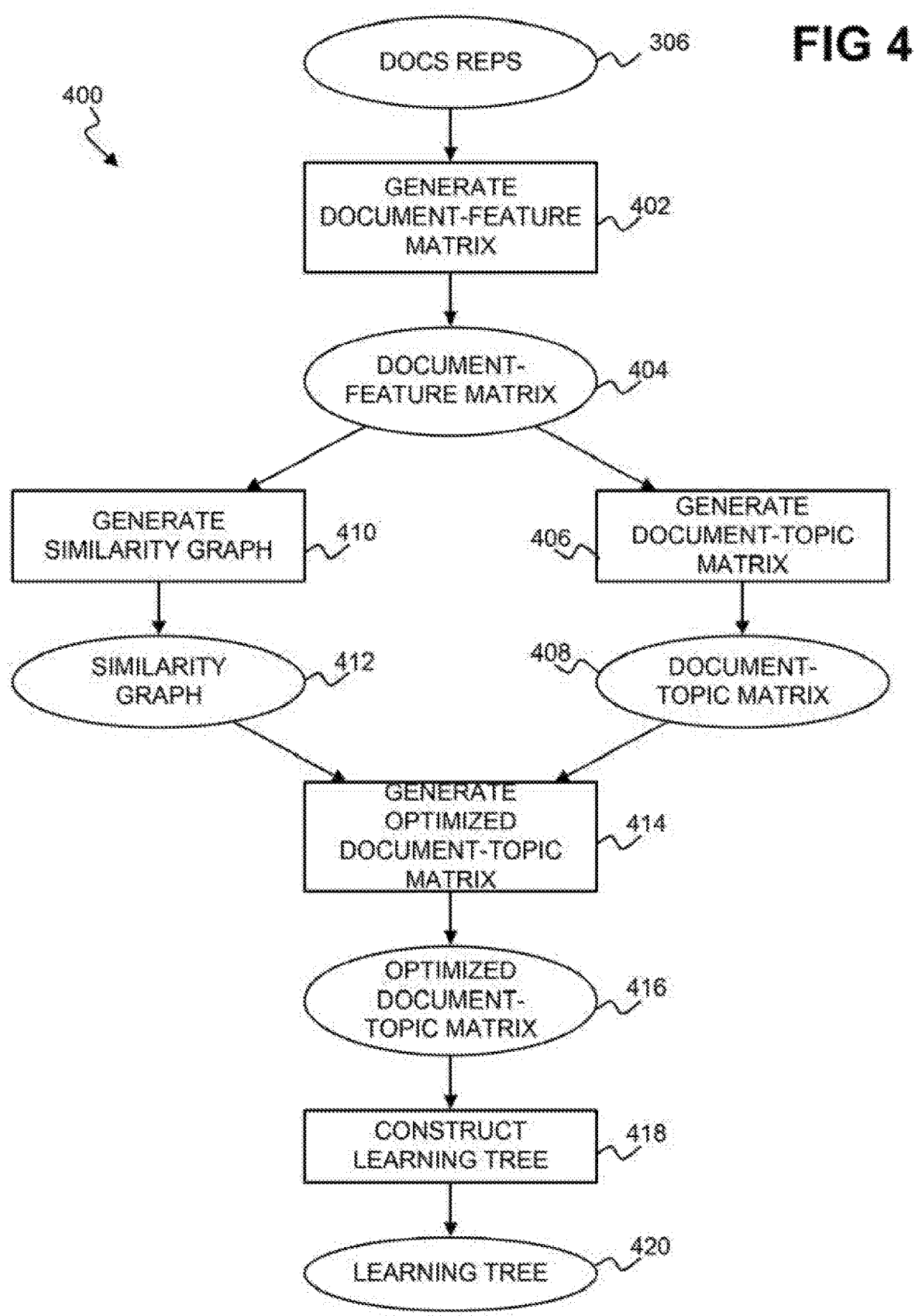

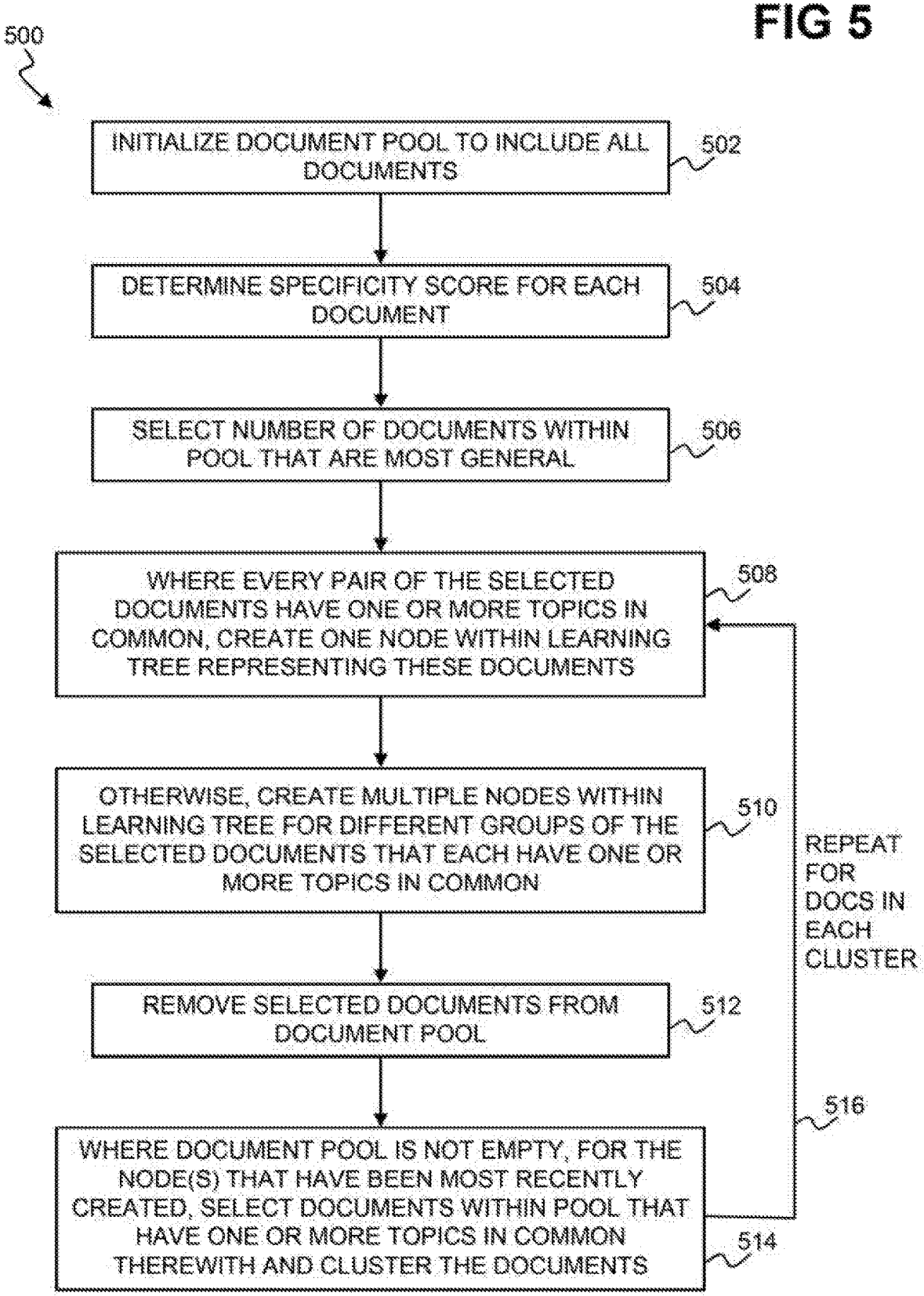

LEARNING GRAPH

BACKGROUND

With the advent of the Internet and other large-scale networks, users have a plethora of easily accessible information available to them. The information can take the form of documents, as varied as text files, web pages, video, graphics, images, electronic books, and so on. Using any of a number of different search engines, or in a different way, a user can thus locate relevant documents on nearly any subject.

BRIEF DESCRIPTION OF THE DRAWINGS

FIG. 2 is a flowchart of an example method for generating a learning graph.

FIG. 4 is a flowchart of an example method for generating a learning graph that is a learning tree, and which can be employed in the method of FIG. 3.

FIG. 5 is a flowchart of an example method that can be used to perform part of the method of FIG. 4.

DETAILED DESCRIPTION

As noted in the background section, users now have available to them easily accessible documents on nearly any subject. However, while a user can use a search engine or a different approach to locate documents related to a subject, existing approaches did not assist the user in learning the subject. For example, a user interested in learning calculus can easily locate many documents related to calculus. Unless presented with an author-dictated order of material, however, the user is typically at a loss as to how to proceed through the documents in order to adequately learn this subject.

Disclosed herein are techniques for generating a learning graph, such as a learning tree, through documents, for a user to learn a subject related to a learning goal of a user. The learning graph is generated according to a sequencing approach, and is a directed graph that specifies a learning path through the documents to achieve the learning goal. That is, the learning graph specifies the order in which the documents should be reviewed by the user in order to learn the subject. This path through the documents can be dynamic, and updated as proficiency in the subject is gained or is not being achieved.

In general, the learning graph includes nodes corresponding to the documents, as well as edges. Each edge connects two nodes, and indicates a sequencing relationship between the documents to which the nodes correspond. The sequencing relationship specifies the order in which these documents are to be reviewed in satisfaction of the learning goal. As such, a user can use the techniques disclosed herein to determine a learning path through any set of documents, without requiring an author or other user to manually generate or otherwise dictate an order in which this material should be reviewed.

The sequencing relationship among documents denotes the order of specificity as to the subject in question of the documents. Examples of such sequencing relationships include from general to specific, from specific to general, and equally specific to equally specific, in relation to the subject in question. Another sequencing relationship may be from theory, such as lectures, to application, such as exercises. As such, the learning path permits a user to review documents following a particular sequence depending on the type of learning the user wishes to accomplish. For instance, the type of learning may be based on templates, such as categorized as beginner, efficient, and expert, on personality profiles, on task or job needs, and so on.

Figure 1A:
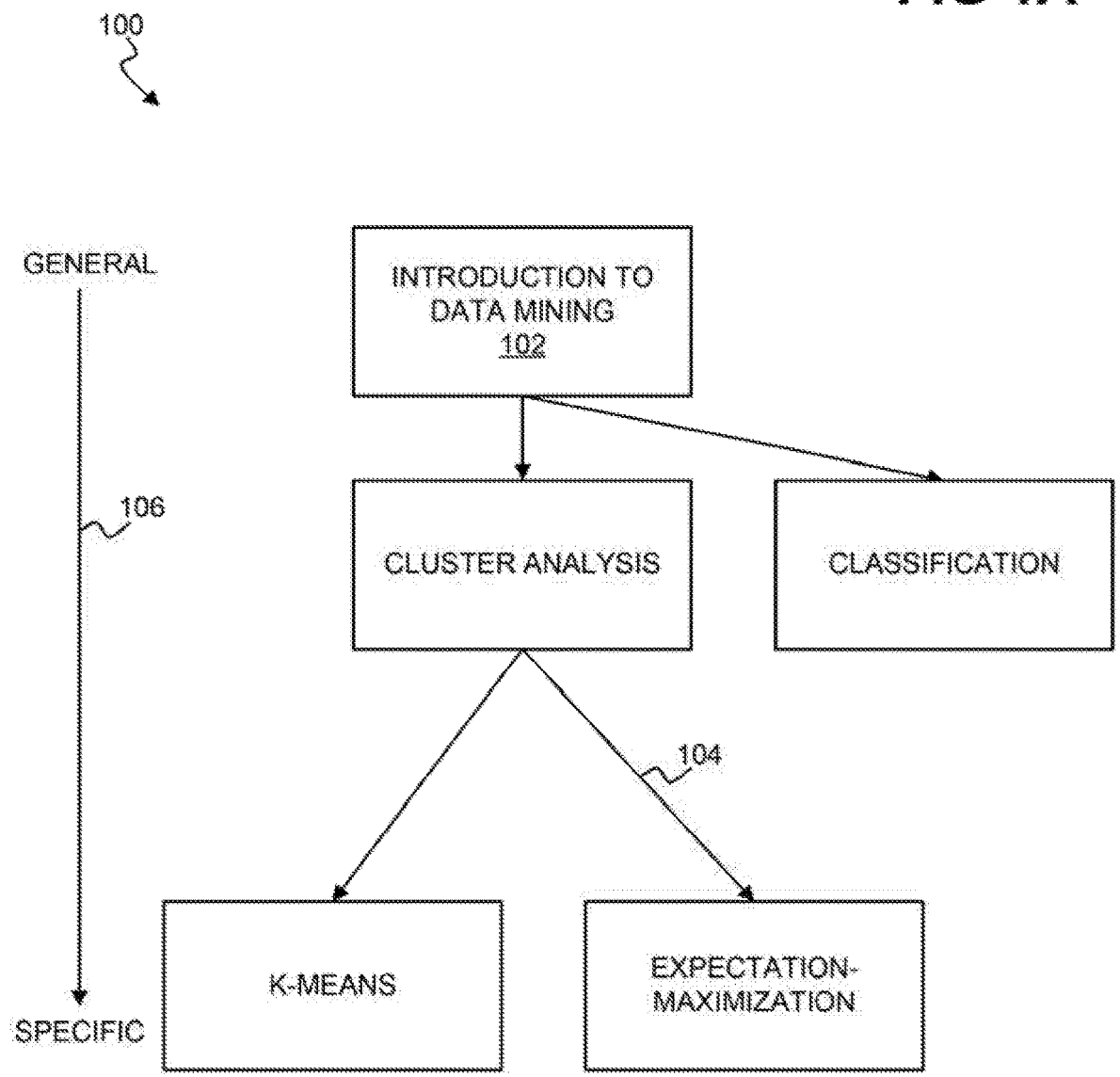
FIGS. 1A, 1B, and 1C are diagrams of example learning graphs.
Figure 1B:
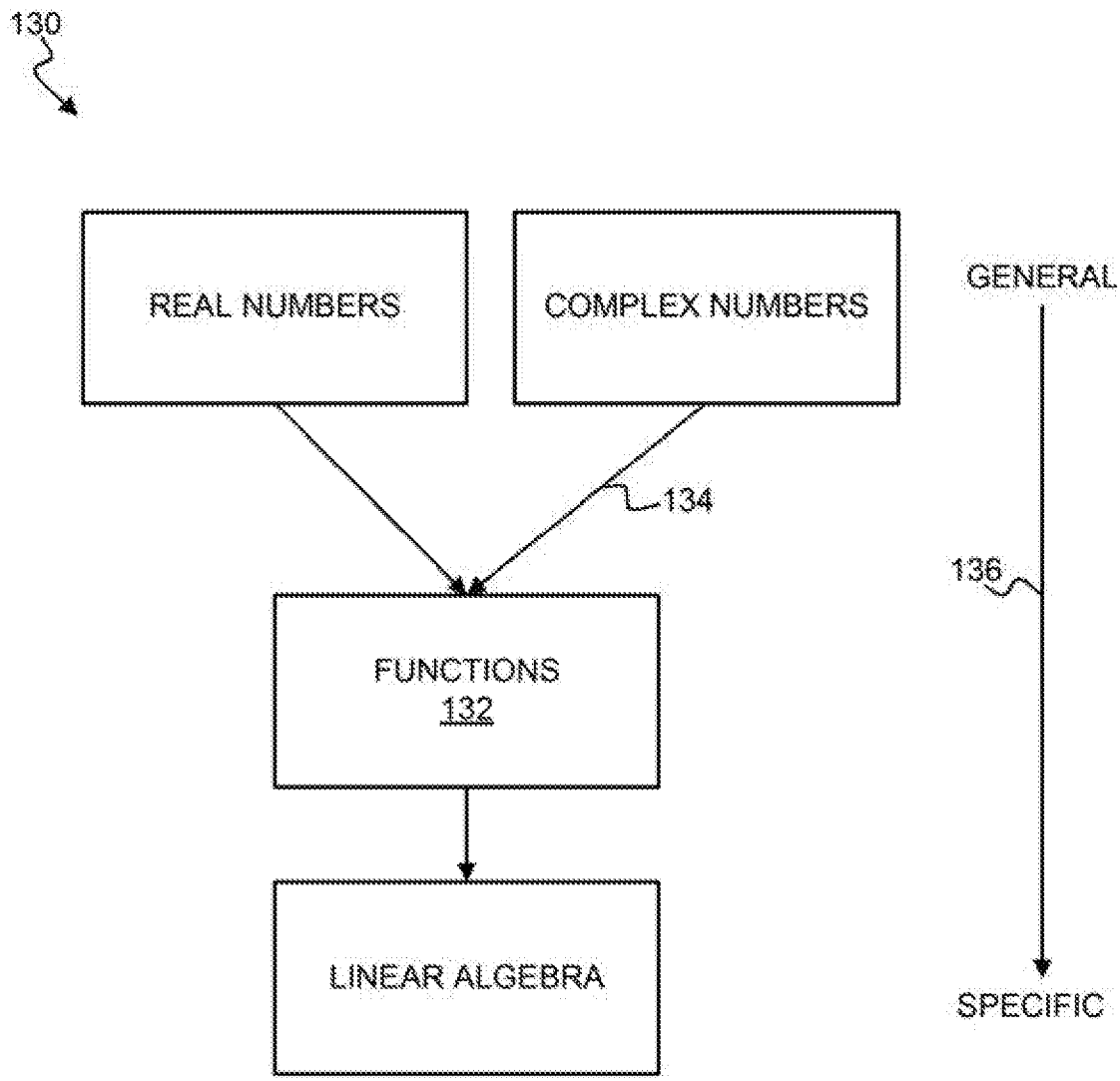
Figure 1C:
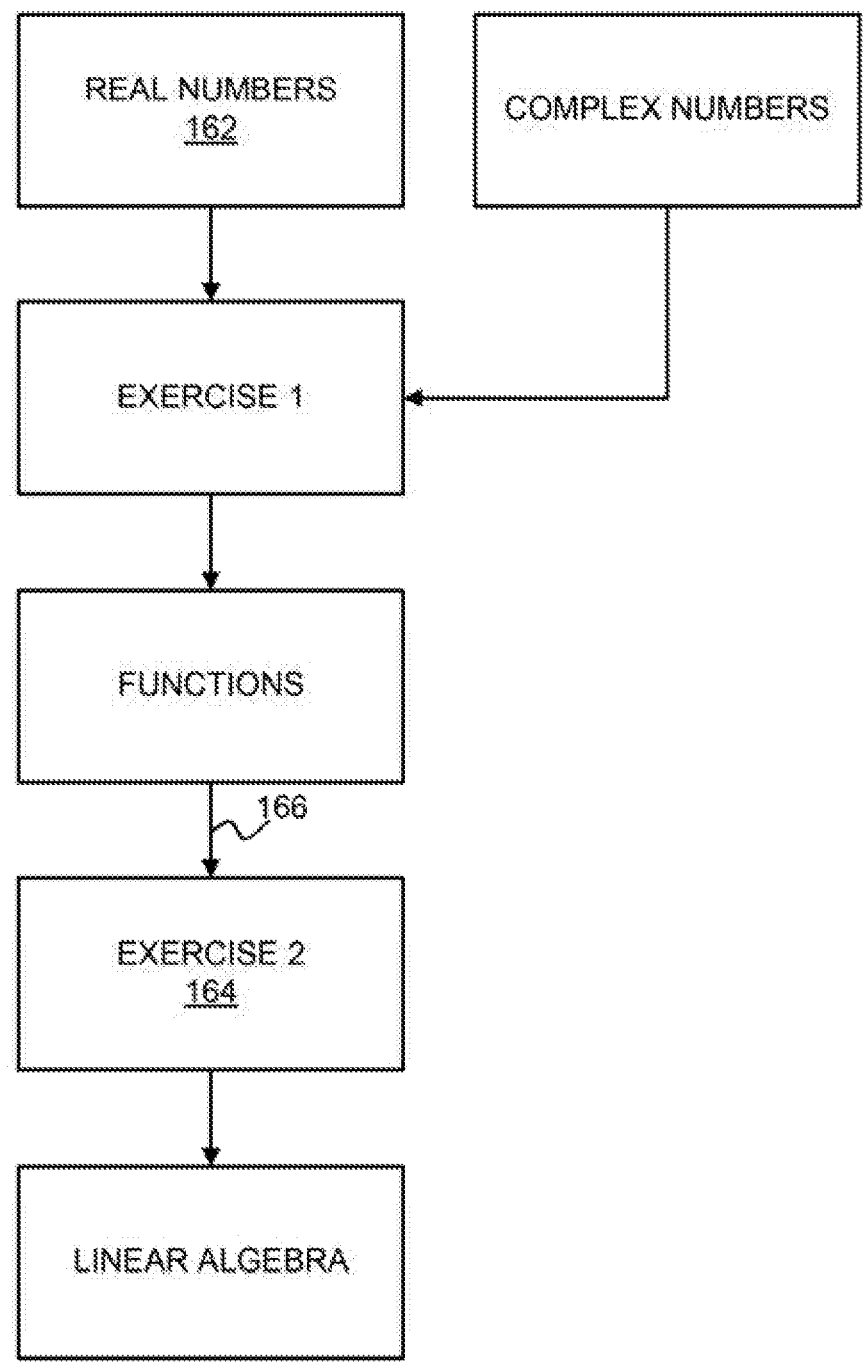

FIGS. 1A, 1B, and 1C depict different example learning graphs 100, 130, and 160, respectively. The example learning graph 100 of FIG. 1A includes nodes 102 corresponding to documents related to data mining. The nodes 102 are connected to one another via edges 104 in the learning graph 100. As indicated by the arrow 106, the nodes 102 are ordered within the graph 100 via the edges 104 from most general to most specific, as one type of sequencing relationship among the documents.

The example learning graph 130 of FIG. 1B includes nodes 132 corresponding to documents related to linear algebra. The nodes 132 are connected to one another via edges 134 in the learning graph 130. As indicated by the arrow 136, the nodes 132 are ordered within the graph 130 via the edges 134 from most specific to most general, as another type of sequencing relationship among the documents.

The example learning graph 160 of FIG. 1C includes unshaded nodes 162 corresponding to theory-related documents and shaded nodes 164 corresponding to application-related documents. The nodes 162 and 164 are connected to one another via edges 166 in the learning graph 160. The nodes 162 and 164 are alternately ordered within the graph 160 via the edges 166, indicating another type of sequencing relationship among the nodes in which the documents are traversed in an alternating fashion from theory, such as lectures, to application, such as exercises.

FIG. 2 shows an example method 200 for generating a learning graph for documents. As with other methods presented herein, the method 200 can be implemented as computer-executable code stored on a non-transitory computer-readable data storage medium. The code is executable by a processor of a computing device to perform the method 200. As such, the learning graph can be generated without human interaction.

A document is first selected to be represented with a first node of the learning graph (202). Initially, the learning graph is devoid of any nodes. Therefore, one of the documents is selected to be represented with the first node of the learning graph. The document can be randomly selected, or selected in another fashion. For instance, the document may be selected based on its content or its relationships with the other documents. The document may be selected differently depending on the type of the user for which the learning graph is being generated, such as the starting level of skill or proficiency of the user in question.

If there are any documents that have not yet been represented by nodes within the learning graph (204), as will be the case the first time part 204 is encountered, the method 200 proceeds to select a set of the documents not yet represented by nodes within the graph (206). This set of documents is typically less than all the documents that are not yet represented by nodes within the learning graph, until a final set of remaining such documents is selected. That is, as will become apparent later in the detailed description, part

206 and the subsequent parts of the method 200 are performed more than once, in an iterative or recursive manner.

A clustering approach may be employed in part 206, for instance, to cluster the documents into various sets. It is noted that the level of clustering determines an absolute and a relative number of topics or subtopics within a document set. Each time part 206 is performed, a different one of the clusters is selected as the set of documents in question, until all the clusters have been processed. Other techniques may also be used to select the set of documents in part 206, including simply randomly selecting one or more of the documents as the set, from the documents that have not yet been represented with nodes in the learning graph.

At least one current document is set to a document within the set of documents (208), although part 208 is described in detail in relation to an example in which one current document is selected. The documents within the set may be traversed in any order. For instance, the current document may be randomly selected among the set of documents that have not yet been processed. A current node may then be created within the learning graph that represents the current document that has been selected (210). At first, the current node does not have any edges between it and any other node within the learning graph. Depending on the relationship of the current document to documents in the nodes of the graph, a new node may be created for the current document. Alternatively, the current document may instead be added to an existing node. For example, a new node is created for the current document if the document is not similar to and does not have equality specificity with the document(s) of an existing node. By comparison, if the current document is similar to and has equal specificity with the documents) of an existing node, the current document is instead added to the existing node in question.

The relationship between the current document and each document already represented by a node within the learning graph is determined (212). An entropy-based approach, a classification technique, or another approach may be employed to determine these relationships. That a relationship is determined between a current document and a document already represented by a node within the learning graph may include varying levels of weights as to the extent to which the current document is related to this latter document. For example, two documents may be completely unrelated to one another, completely related to one another, or related to one another to some degree in-between, such as by using a cosine similarity approach.

The relationship between two documents includes a relationship type. For example, between the current document and a given document, the relationship may be specific to general, general to specific, equally specific (or general), and so on. The approach that is used to determine the relationships for a particular current document may further differ or be modified depending on the relative clustering power of this particular document. For example, the parameters governing classification may vary depending on the clustering tightness between the particular document and other documents within the set.

From the relationships that have been determined, one or more relationships may be selected to be represented by edges within the learning graph (214). For instance, where the relationships are weighted, just relationships having at least a predetermined weight may be selected for representation by edges. As another example, if just one type of relationship is desired for the learning graph, such as general to specific, then just relationships of this type are selected, and relationships of other types, such as specific to general, are not.

It is noted that no relationships may be selected. In this case, the current node that was created within the learning graph for the current document in part 210 may be removed and the current document will be eligible for placement within a different set of documents not yet represented with nodes within the graph in part 206. If the current node is not removed, however, it is not currently connected to other existing nodes within the graph, but subsequently created nodes may be connected to the current node, such that the final output is a graph having disconnected components. Assuming that one or more relationships are selected, for each such relationship an edge is created within the learning document between the current node and the node representing the document in question in the relationship (216).

If any documents remain in the set that have not yet been selected as a current document of the set in part 208, then the method 200 proceeds back to part 208 (218). That is, all the documents of the set are processed as has been described in relation to parts 208, 210, 212, 214, and 216. Once all the documents of the set have been processed, then the method—recursively or iteratively—proceeds back to part 204 (218).

As such, if any documents are not yet represented by nodes within the learning graph—including documents that were previously analyzed in relation to parts 212 and 214 but no edges were created therefor in part 216—then the method 200 proceeds to part 206 again (204). Ultimately, however, all the documents will be represented by nodes within the learning graph (204), in which case the method 200 is finished (220). The result of the method 200 is thus a learning graph having nodes representing the documents, with edges thereinbetween indicating sequencing relationships among the documents. As such, the learning graph is a directed graph that specifies a learning path a user should traverse through the documents to achieve a desired learning goal.

Figure 3:
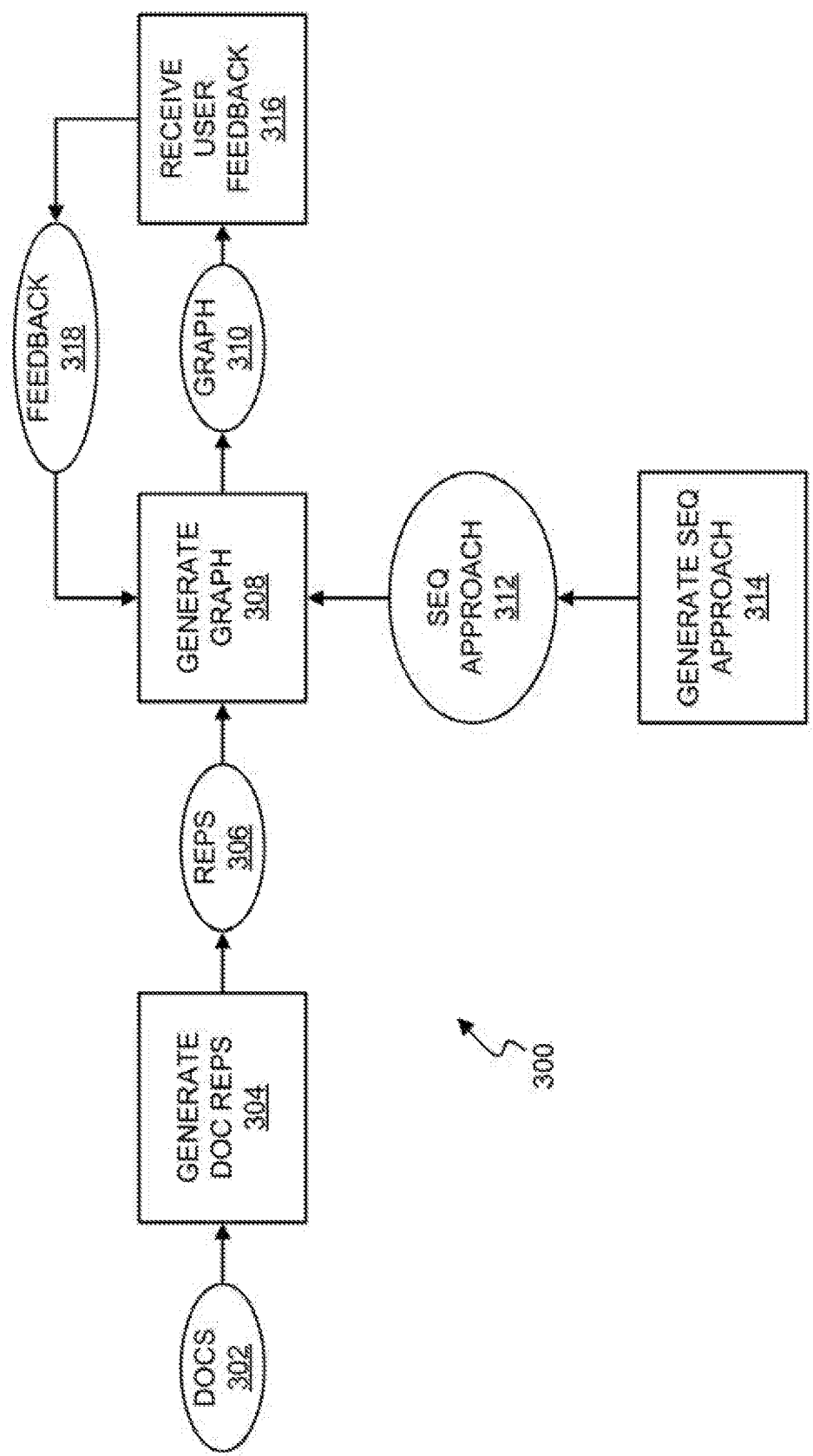
FIG. 3 is a flowchart of an example method that can employ the method of FIG. 2.

FIG. 3 shows an example method 300 that subsumes the method 200 that has been described. In FIG. 3, parts of the method 300 that are performed are represented by rectangles. By comparison, ovals represent input and output in FIG. 3.

Documents 302 are the documents through which a learning path is determined for a user to learn a subject associated with a learning goal of the user. The user may partially or completely manually select the documents 302, or the user may not be involved at all in selecting the particular documents 302. For example, a user may input the subject in question into a search engine, and then select documents that appear beneficial to the user as the documents 302. As another example, a predetermined number of the documents highest ranked by the search engine may be selected as the documents 302, without user involvement.

The method 300 generates document representations 306 of the documents 302 (304). Each document representation encodes one or more features of a corresponding document. These features can be diverse as the document's actual content, how the document is formatted, and its function. The format of a document can be whether it is text, image, video, software, and so on. The function of a document may be considered its type, such as whether the document is a lecture, a test, an interactive exercise, and so on. Other document attributes that can be features include difficulty, presentation elements, interactivity level, and so on.

The document representations 306 may be generated at least in part based on metadata regarding the documents 302, such as a given document's description. Other features of the document representations 306 may be algorithmically extracted, using feature-extraction techniques. Such feature-extraction techniques including information retrieval models, as well as topic models for text, image processing for images, and so on.

The method 300 generates a learning graph 310 from the document representations 306 using a sequencing approach 312 (308). The method 200 that has been described can be used to implement part 308 of the method 300. In this respect, the method 200 can be operable on the document representations 306 as opposed to the documents 302 themselves.

The features of the documents 302 within the document representations 306 thereof may be considered as being grouped along several feature dimensions. Such feature dimensions can affect how the learning graph 310 is generated. For instance, the learning graph 310 may have several layers, where nodes of one layer serving one function, such as lectures, while nodes in another layer serve another function, such as exercises. The nodes may be linked with edges both on an intra-layer and inter-layer basis.

The sequencing approach 312 is used by the method 300 in part 308 to generate, for any pair of two documents, the sequencing relationship between them. The sequencing approach 312 thus dictates how part 212 of the method 200 is performed, for instance. The sequencing approach may include an entropy-oriented approach, a link-oriented approach, as well as a sequencing learning approach.

For instance, the specificity of a document can be algorithmically determined and the relationship between two documents determined according to their relative specificities. Entropy measures, such as Shannon's entropy, residual entropy (i.e., entropy of uncommon terms), or distribution entropy (entropy of the location of common, uncommon, and both types of terms) through a document may be employed to determine the specificity of a document. The number of such terms may be employed as the measure of specificity of a document, in another implementation.

Links between documents can further be used to determine the relationship between documents, insofar as the order in which they should be traversed and thus the direction of the edge between them. For example, a web page that links to another web page should be reviewed before the latter web page. Other types of links besides hyperlinks can include citations among scholarly papers, and so on.

Sequencing learning approaches can be employed to learn relationships among documents. As such, the method 300 can be used to generate such a sequencing learning approach (314). The sequencing learning approach can be generated using a machine learning method based on prior knowledge, a pattern- or sequence-mining technique to extract patterns from logs representing existing user-document interactions, and/or crowdsourcing methods. The sequencing learning approach can additionally or alternatively be generated using a biasing technique in which interactions of the specific user in relation to which the documents 302 are being considered to generate the learning graph 310 are considered to bias the graph 310 towards this user.

Once the learning graph 310 has been at least partially generated, the method 300 may receive user feedback 318 from the user (316), and this user feedback 318 may be employed to regenerate the graph 310 (308) so that it can be better adapted to the user in question. That is, the learning graph generation process may be an incremental, reinforcing process that takes into account user feedback collected as the user interacts with the learning graph, to customize or modify the learning graph for this user. The learning graph generation process may also be dynamically adapted to how the user uses the learning graph in achievement of the learning goal.

As an example of the incremental, reinforcing process that takes into account such user feedback, a user may have to learn topics A, B, C, D, and E that are associated with the subject in question. The learning graph generation process may generate nodes in which A and B have equal specificity, and a node combining C and D. However, from prior user feedback 318, it may be known that the user already knows D. Therefore, rather than combining C and D, the method 300 may combine C and E instead.

FIG. 4 shows an example method 400 that can also be subsumed within the method 300. In FIG. 4, parts of the method 400 that are performed are represented by rectangles. By comparison, ovals represent input and output in FIG. 4.

The method 400 generates a document-feature matrix 404 from the documents 302 or the document representations 306 thereof (402). The document-feature matrix 404 is generated with respect to features present within the documents 302. Hence, a document is represented with the assistance of the features. For instance, documents can be represented using terms, where the terms are the features. The document-feature matrix 404 thus indicates for each document 302 which of the terms are present therein. A cell in the matrix represents a weight or score that indicates how well a feature represents a document. For example, the weight or score can be a term weight that may represent the term frequency of a corresponding term in a document. As another example, term weights can be specified by using an approach in which term frequency is multiplied by inverse document frequency.

As part of generating the document-feature matrix 404, the method 400 can perform preprocessing, such as removing noisy and stop words from the documents 302 or their document representations 306, stemming the documents 302 or their representations 306, and so on. For instance, words can be removed by using a term frequency multiplied by inverse document frequency approach, where words that are below a threshold are removed. The method 400 selects features that represent the contents of the documents 302. Features can be words, terms, n-grams, and so on.

The document-feature matrix 404 can be mathematically represented as $X_{n \times d}$. In this representation, n is the number of documents 302, and d is the number of features. Thus, for any document n, which features d are represented within the document are indicated by the document-feature matrix 404.

The method 400 generates a document-topic matrix 408 from the document-feature matrix 404 using a topic model (406). The document-topic matrix 408 indicates for each document 302 a probability as to whether each of a number of topics is present in the document. The topics are more general and more abstract than features.

The topic model is thus used to discover the abstract topics that occur within the documents 302. Given that a document 302 is about a particular topic, for instance, it can be expected that particular words or features appear in the document 302 more or less frequently. The topic model can be a statistical model that discovers the topics that occur within the documents 302. After generating the topics in this respect, each topic is represented by a set of features that frequently occur together. Examples of topic models include statistical models such as a probabilistic latent semantic indexing (PLSI) model, as well as a latent Dirichlet allocation (LDA) model.

Generation of the document-topic matrix 408 transforms the document-feature matrix 404 into a topic-feature space matrix in effect. The document-feature matrix 404 is input into the topic model. The output of the topic model is the document-topic matrix 408.

The document-topic matrix 408 can be mathematically represented as $F^{(0)}$. For example, consider four topics generated from five documents, where each topic is represented by a set of words or other features. A value $F_{ij}$ in the document-topic matrix captures the probability score that the i-th document covers the j-th topic.

The method 400 also generates a similarity graph 412 from the document-feature matrix 404 (410), which is not to be confused with a learning graph that has been described. The topic model used in part 406 may discover the topics that occur in the documents 302, but may mis-assign the topics to the documents 302, or may fail to detect some topics. To correct for this, parts 410 and 414 of the method are performed. In part 410, the similarity graph 412 that is generated represents how similar each different pair of the documents 302 are to one another.

The similarity graph 412 can be mathematically represented as W. Different implementations may construct the similarity graph 412 differently. The similarity graph can compare feature representations 308 of the documents 302, compare links that connect the documents 302 among one another, and/or employ co-citation information regarding the documents 302, among other techniques or approaches.

For example, the similarity graph 412 can capture the explicit similarities among me documents 302 by comparing the feature representations 308 thereof. In this implementation. W=(V,E) denotes an undirected similarity graph constructed from the documents 302. Here, $V=(v_1, v_2, \ldots, v_n)$ is a set of nodes associated with the document features $X=(x_1, x_2, \ldots, x_n)$. Further, E is a set of undirected links constructed from the similarity of pairs of nodes, where the link weight of $e_{ij}=(v_i,v_j)$ is defined as the similarity of $x_i$ and $x_j$.

Different similarity calculation techniques can be used to determine such similarity. As one example, cosine similarity may be employed, in which the similarity $\text{sim}(x_i,x_j)$ of $x_i$ and $x_j$ is $$\frac{X_i \cdot X_j}{\|X_i\|\|X_j\|}.$$

It is noted that the document-feature matrix 404 is used to generate the similarity graph in part 410, as opposed to the document-topic matrix 408 being used. This is because if the document-topic matrix 408 were used, each topic would be treated as a document feature, and any errors resulting from document-topic matrix generation in part 406 would be accumulated instead of corrected.

As another example, the similarity graph 412 can be constructed by comparing links connecting the documents 302, such as hyperlinks, and so on. A link between two documents 302 indicates that these documents 302 are related or similar to some extent. As a third, similar example, the similarity graph 412 can be constructed by using co-citation information regarding the documents 302. For instance, if the documents 302 are scholarly papers, then two documents 302 that are co-cited in the same other document 302 may be considered as being similar to some extent. Furthermore, the similarity graph may contain just a subset of the edges that can be defined among the documents based on their similarity relationship. For example, edges in the document similarity graph that have very low weights may not be considered significant and they may be pruned.

The method 400 generates an optimized document-topic matrix 416 by propagating the topic probabilistic scores for each document of the document-topic matrix 408 over the similarity graph 412 using a score-propagation technique (414). As noted above, the topic model used to generate the document-topic matrix 408 in part 406 may mis-assign topics among the documents 302 or fail to detect some topics. The score-propagation technique is thus used in part 414 to propagate document-topic distribution scores of the document-topic matrix 408 by exploiting the document similarity relationships within the similarity graph 412 to reinforce or correct the document-topic matrix 408. In this way, the document-topic matrix 416 is an optimized version of the document-topic matrix 408.

The score-propagation technique leverages the fact that highly similar documents 302 have a high chance of sharing similar topics. The similarity graph 412 and the document-topic matrix 408 are input into part 414. Part 414 of the method 400 thus utilizes the topic and graph information to propagate the topic probabilistic scores for each document of the matrix 408 within the graph 412.

The document-topic matrix 408 represents an initial distribution of topics across the documents 302. These topic probabilistic scores are propagated over the similarity graph 412 so that potential topics of a document 302 that are not detected or wrongly assigned by the topic model in part 406 are propagated over graph 412 by taking into consideration the topic probabilistic scores of their neighbors. The score-probabilistic technique can iteratively update the probabilistic score of each node of the similarity graph 412 based on the weighted average of the scores of its neighbors.

The score-probabilistic technique can minimize an objective function, such as $$\min_F Q(F) = \frac{1}{2}\sum_{ij} W_{ij}\left[\frac{F_i}{\sqrt{D_{ii}}} - \frac{F_j}{\sqrt{D_{jj}}}\right]^2 + \frac{\mu}{2}\sum_i (F_i - F_i^{(0)})^2.$$

In this objective function, W is the similarity matrix, and D is a diagonal matrix having diagonal elements given by $D_{ii}=\Sigma_j W_{ij}$. The matrix F is the topic probabilities matrix (i.e., the optimized document-topic matrix 416), $F_{ij}$ represents the probability that the i-th document covers the j-th topic, and $F^{(0)}$ is the initial topic probabilistic score matrix generated using the topic model. The first term in the objective function ensures that the topic probabilistic scores for any pair of documents connected by a highly weighted link do not differ substantially. The score term ensures that the scores of the nodes of the graph should not deviate significantly from their initial values.

In one approach to attempt to optimize the objective function, a partial derivative is taken with respect to F and set to zero. An iterative update formula of this partial derivative is $F=\beta\hat{W}F+(1-\beta)F^{(0)}$. In this formula, $$\hat{W} = D^{-\frac{1}{2}} W D^{-\frac{1}{2}}$$

is the normalized similarity matrix, and $$\beta = \frac{1}{1+\mu}$$

controls the tradeoff between biasing the scores according to the similarity graph structure as opposed to the initial score matrix $F^{(O)}$. This tradeoff control parameter can vary between zero and one, where when set to zero the topic scores are equal to the initial values generated from the topic model, and when set to one depend only on the scores of their neighbors in the similarity graph. In one example, $\beta=0.85$.

As such, the score-propagation technique can propagate the scores of the document-topic matrix 408 over the similarity graph 412 by minimizing an objective function to realize the optimized document-topic matrix 416. In one implementation, this can be achieved algorithmically by iteratively updating the optimized document-topic matrix 416 using the iterative update formula noted above. The number of iterations by which the optimized document-topic matrix 416 is updated can vary depending on the implementation, such as the number of documents 302, the processing power available, and so on.

The method 400 constructs a learning tree 420 from the optimized document-topic matrix 416 (418). The learning tree 420 is a particular type of learning graph. As such, the learning tree 420 specifies a learning path through the documents 302, from most general to most specific, to achieve a learning goal of the user. The learning tree 420 is therefore a hierarchical, specificity-oriented tree.

FIG. 5 shows an example method 500 that can be employed to construct the learning tree 420 in part 418 of the method 400. A document pool is initialized to include all the documents 302 within the optimized document-topic matrix 416. A specificity score is determined for each document 302 (504).

Different metrics can be used to measure the generalness or specificity of each document 302 within the optimized document-topic matrix 416, and thus to determine the specificity score for each such document 302. For example, entropy measures, such as Shannon's entropy, residual entropy (i.e., entropy of uncommon terms), or distribution entropy (entropy of the location of common, uncommon, and both types of terms) through a document 302 may be employed to determine the specificity of a document 302 (i.e., its specificity score).

In other implementations, predefined, domain-specific vocabularies or ontologies can be used to classify each document 302 as to the concepts of a given subject to which the document 302 relates. In this way, the specificity scores of the documents 302 can be determined. For example, a document 302 that maps to a more general concept or category of a vocabulary or ontology is scored as more general than a document 302 that maps to a more specific concept or category of the vocabulary or ontology. In one implementation, the optimized document-topic matrix 416 may contain just terms from a salient vocabulary or ontology, then, whereas in another implementation, terms within the vocabulary or ontology are weighted more heavily than terms that are not in the vocabulary or ontology.

The method 500 selects a number of the documents 302 within the document pool that are most general, as indicated by their specificity scores (506), which may be the documents 302 having the highest such scores or the lowest such scores, depending on the measure being employed. The number of such documents 302 that are selected can be controlled by a sizing parameter. In such an implementation, the sizing parameter further controls the size and/or depth of the learning tree 420 that is constructed, and the number of documents 302 that is selected is equal to the sizing parameter. However, other implementations may employ other selection strategies. For example, documents that have minimum overlap may be selected, documents that have minimum generality variation may be selected, or documents that have both maximum overlap and minimum generality variation may be selected.

If every pair of the selected documents has one or more topics m common, as determined via the optimized document-topic matrix 416, then a single node is created within the learning tree 420 to represent all the selected documents (508). Otherwise, if every pair of the selected documents does not have one or more topics in common, then multiple nodes are created within the learning tree 420 (510). Each of these multiple nodes represents a different group of the selected documents that does have one or more topics in common.

The selected documents in either case are removed from the document pool (512). If the document pool still contains one or more documents, then for each node that has been most recently created (i.e., in the most recent performance of part 508 or part 510), documents are selected from the pool that have one or more topics in common with the documents represented by the node in question, and are clustered (514). The number of clusters that are determined may be equal to a predetermined parameter. The method 500 is then recursively repeated for the documents of each such cluster (516), where the node(s) that are subsequently created in part 508 or part 510 are linked within the learning tree 420 as children nodes to the node from which the nodes were spawned.

For example, the first time the method 500 is performed, documents A, B, and C may be selected in part 506, and it is determined that each pair A-B, B-C, and A-C share one or more common topics. Therefore, a single node N1 is created to represent documents A, B, and C in the learning tree 418. In part 514, documents D, E, F, and G may be selected as having one or more topics in common with documents A, B, and C of node N1, and may be clustered as a first cluster including documents D, E, and F, and a second cluster including just document G. The node(s) N2 that are then created in part 508 or part 510 for documents D, E, and F are linked as children nodes to the node N1 in the learning tree 420, as is the node N3 that is then created in part 508 for the document G. The method 500 is thus recursively repeated, until all the documents within the document pool are represented by nodes within the learning tree 420.

As noted above, entropy measures, such as Shannon's entropy, can be employed to determine the specificity scores of the documents 302. In general, the higher a document's entropy is, the more topics it covers and thus the more general the document is. Entropy for a given document i can be mathematically defined as $$E_i = \sum_j -F_{ij}\log(F_{ij}),$$

where F is the optimized document-topic matrix having rows i corresponding to the documents and having columns j corresponding to the topics, such that $F_{ij}$ is the topic score of document i for topic j. For such a definition of entropy, F can be normalized so that the sum of each row in the matrix is 1.0.

To determine if documents share common topics, a similarity metric such as the Jaccard similarity score may be employed. A given set of documents have common topics only if their similarity score is non-zero or above a predetermined threshold. For two documents A and B having sets of topics $T_A$ and $T_B$, respectively, where $T_A$ includes all the topics for which A has a non-zero topic score in the matrix F and $T_B$ includes all the topics for which B has a non-zero topic score, the Jaccard similarity score of documents A and B is $$\left| \frac{T_A \cap T_B}{T_A \cup T_B} \right|.$$

Thus, the Jaccard similarity score is non-zero so long as there is at least one topic that both documents A and B share.

In some scenarios, in part 514 there may still be documents within the document pool, but none of these documents may have topics in common with the documents represented by the node(s) most recently created in part 508 or part 510. In these scenarios, construction of the learning tree 420 ceases with documents still not being represented in the tree 420. In one implementation, the unrepresented documents may simply be discarded, but in another implementation, the method 500 may be performed where the document pool is initialized to include just the unrepresented documents in part 502, such that another learning tree 420 is created. As such, multiple learning trees 420 can be created in this implementation.

As has been described, the method 500 can be used to implement part 418 of the method 400, which itself can be subsumed within the method 300. As such, the learning tree 420 that is generated is a particular type of the learning graph 310, and the method 400 is a particular implementation of part 308. The sequencing approach 312 is used in two aspects of the method 400: the generation of the similarity graph 412 in part 410, and the construction of the learning tree 420 in part 418. This is because the sequencing approach 312 dictates the order in which two documents should be reviewed, and thus dictates the relative specificities of these two documents. Similarly, the sequencing approach 312 is used in the method 500 in at least part 504, where the specificity score of each document is determined, and can also be used in parts 508, 510, and 514, to determine whether documents have topics in common with one another, and thus whether the documents are similar to each other.

Figure 6A:
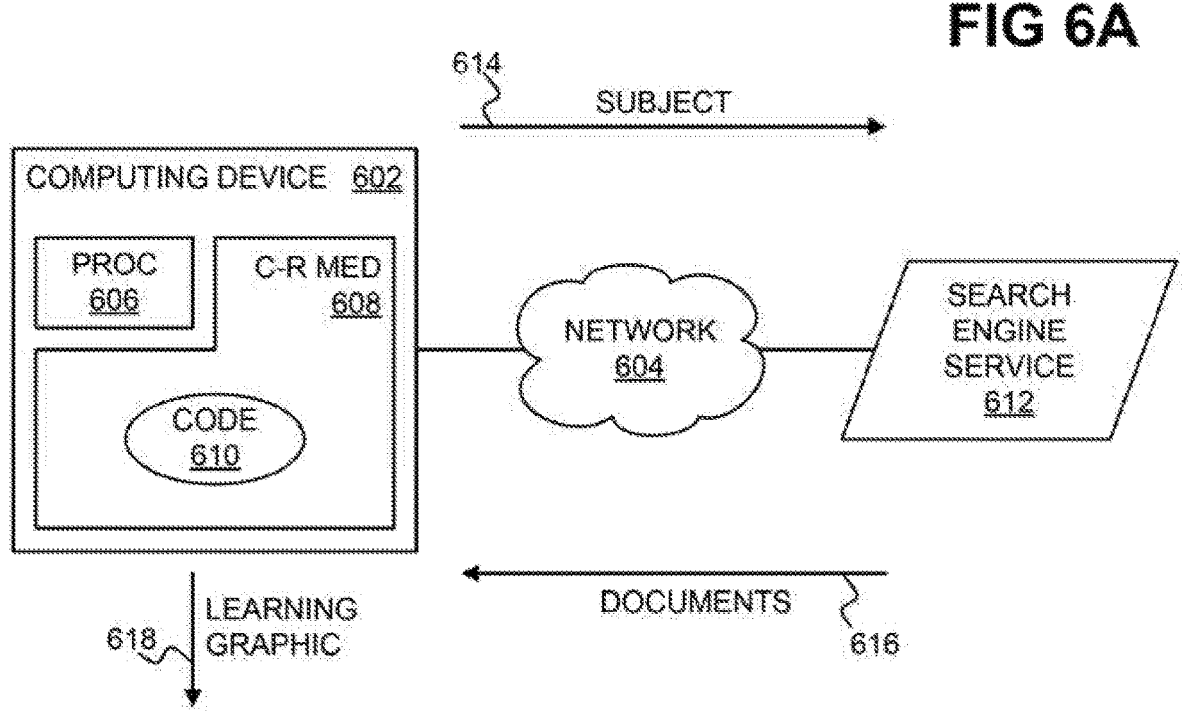
FIGS. 6A and 6B are diagrams of example computing environments in which the methods of FIGS. 2, 3, 4, and 5 can be employed.
Figure 6B:
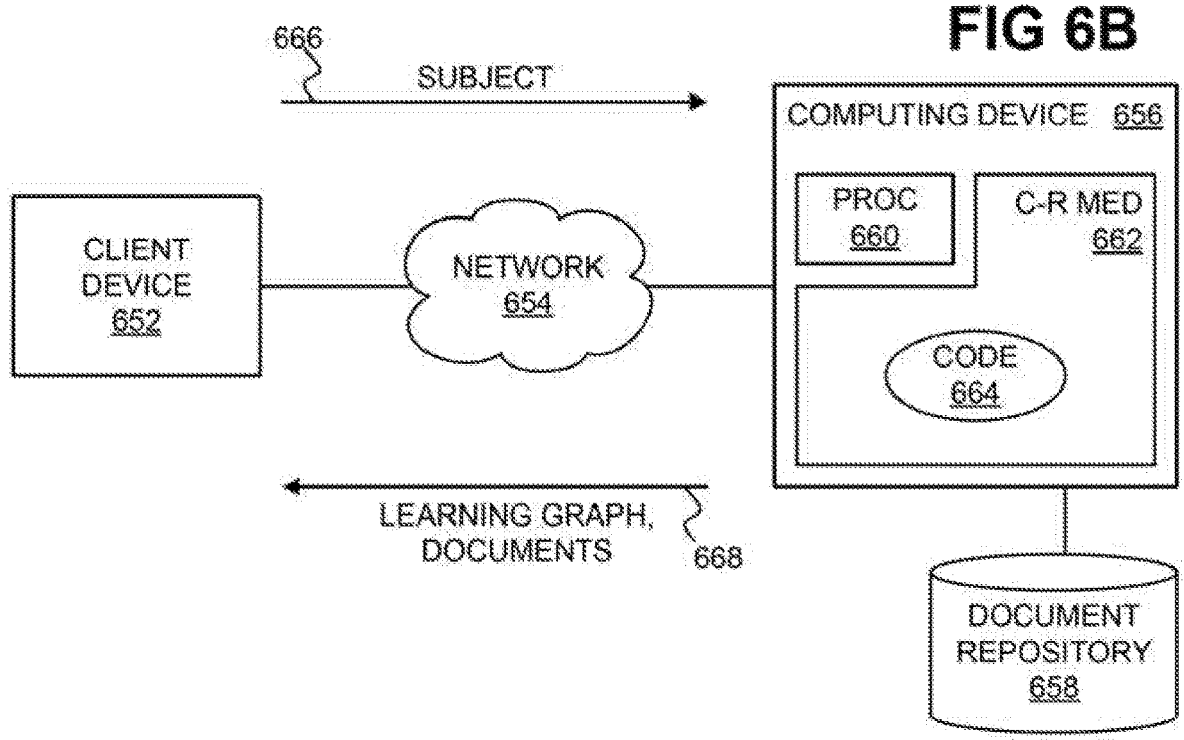

FIGS. 6A and 6B show different examples by which the methods 200, 300, 400, and 500 can be implemented in various computing environments. In the example of FIG. 6A, a computing device 602 is communicatively connected to a network 604, such as the Internet. The computing device 602 includes at least a processor 606 and a computer-readable medium 608 medium that stores code 610 executable by the processor 606. A user inputs a subject that he or she wishes to learn via a user interface exposed by the code 610.

In turn, the code 610 transmits the subject 614 as a search term to a search engine service 612, such as an Internet search engine, over the network 604, as indicated by the arrow 614. In response, the code 610 receives from the search engine service 612 documents related to the subject, as indicated by the arrow 616. The code 610 generates a learning graph, such as a learning tree, from at least a subset of these documents, as indicated by the arrow 618, using the methods 200, 300, 400, and 500 that have been described.

In the example of FIG. 6B, a client device 652, such as a client computing device, is communicatively connected to a network 654, such as the Internet, to which a server computing device 656 is also communicatively connected. A user inputs a subject at the client device 652, which transmits the subject to the server computing device 656 over the network 654, as indicated by the arrow 666.

The server computing device 656 may expose a web service in this respect, and includes at least a processor 660 and a computer-readable medium 662 storing code 664 executable by the processor 660. The server computing device 656 is communicatively connected to a document repository 658. In one implementation, for instance, the server computing device 656 may use a search engine search as the document repository 658, no differently than the computing device 602 effectively does in FIG. 6A.

The code 664 is therefore executed by the server computing device 656 to generate a subset of documents stored in the document repository 658 that are related to the subject received from the client device 652. The code 664 further generates a learning graph, such as a learning tree, from this subset of documents, using the methods 200, 300, 400, and 500 that have been described. The server computing device 656 returns the documents and the learning graph to the client device 652 over the network 654, as indicated by the arrow 668.

One difference between the examples of FIGS. 6A and 6B, then, is that in FIG. 6A, the computing device 602 itself generates a learning graph. By comparison, in FIG. 6B, the client device 652 does not generate the learning graph. The example of FIG. 6A may thus be more appropriate for computing devices that have sufficient computing power to generate the learning graph, such as desktop or laptop computers. The example of FIG. 6B may be more appropriate for client computing devices that do not have sufficient computing power to generate the learning graph, or where power conservation or other concerns dictate that learning graph generation is not performed by client devices themselves.

We claim:

1. A method comprising:
    generating, by a processor, a learning graph for a plurality of documents according to a sequencing approach using machine learning, wherein generating the learning graph is based on minimizing an objective function, wherein the objective function includes a first term that includes a similarity matrix indicating similarities between documents that is multiplied with a first difference of a first topic probability matrix and a second topic probability matrix, and includes a second term that includes a second difference of the first topic probability matrix and an initial topic probability matrix, and wherein generating the learning graph comprises determining a set of the documents that are not yet represented within the learning graph by employing a clustering approach, and for each document of at least one document of the set:
        creating a new node within the learning graph representing at least the document;
        determining a relationship between the document and each other document already represented by a node within the learning graph by employing an entropy-based approach or a classification technique; and from the relationships that have been determined, determine whether any edges should be created within the learning graph between the new node and any other node within the learning graph;

wherein the learning graph comprises a plurality of nodes corresponding to the documents and a plurality of edges, each edge connecting two of the nodes and indicating a sequencing relationship between at least two of the documents to which the two of the nodes correspond that specifies an order in which the two of the documents are to be reviewed in satisfaction of a learning goal, and wherein the learning graph is a directed graph specifying a learning path through the documents to achieve the learning goal in relation to a subject.

2. The method of claim 1, further comprising:

generating, by the processor, a plurality of document representations for the documents, where the learning graph is generated using the document representations, wherein each document representation encodes one or more features of a corresponding document, the features comprising one or more of content of the corresponding document, a format of the corresponding document, and a function of the corresponding document.

3. The method of claim 1, wherein the sequencing approach is used to generate, for any pair of two given documents, a sequencing relationship between the two given documents.

4. The method of claim 3, wherein the sequencing approach comprises one of:

an approach that considers links between the two given documents; or a sequencing learning approach.

5. The method of claim 1, further comprising:

generating, by the processor, the sequencing approach as a sequencing learning approach using one or more of:
 a pattern- or sequence-mining technique to extract sequencing patterns from logs representing existing user-document interactions;
 a biasing technique in which interactions of a specific user in relation to documents are considered to bias the learning graph to the specific user; or
 a crowdsourcing method.

6. The method of claim 1, further comprising:

responsive to receiving feedback of the learning graph from a user, regenerating, by the processor, the learning graph to adapt the learning graph to the user.

7. A non-transitory computer-readable data storage medium storing a computer program executable by a processor to perform a method comprising:

generating a document-feature matrix with respect to a plurality of features present within a plurality of documents, the document-feature matrix indicating for each document which of the features are present therein;

from the document-feature matrix, generating a similarity graph representing how similar each different pair of the documents are to each other, and generating a document-topic matrix using a topic model that comprises a statistical model, a probabilistic latent semantic indexing model, or a latent Dirichlet allocation model, the document-topic matrix indicating for each document a probability as to whether each of a plurality of topics is present therein;

generating an optimized document-topic matrix by propagating the topics of the document-topic matrix over the similarity graph using a score-propagation technique, wherein the score-propagation technique minimizes an objective function, wherein the objective function includes a first term that includes a similarity matrix indicating similarities between documents that is multiplied with a first difference of a first topic probability matrix and a second topic probability matrix, and includes a second term that includes a second difference of the first topic probability matrix and an initial topic probability matrix; and constructing a learning tree from the optimized document-topic matrix, the learning tree specifying a learning path through the documents, from most general to most specific, to achieve a learning goal.

8. The non-transitory computer-readable data storage medium of claim 7, wherein generating the document-feature matrix comprises one or more of removing noisy and stop words from each document, stemming each document, and selecting the features that represent contents of the documents.

9. The non-transitory computer-readable data storage medium of claim 7, wherein generating the similarity graph comprises one or more of: comparing feature representations of the documents, comparing links connecting the documents, and employing co-citation information regarding the documents.

10. The non-transitory computer-readable data storage medium of claim 7, wherein constructing the learning tree comprises:
 initializing a document pool including all the documents;
 determining a specificity score for each document;
 selecting a number of the documents within the document pool based on the specificity scores of the documents;
 as an entry point of the method, where every pair of the number of the documents have one or more of the topics in common, creating a single node within the learning tree representing all the number of the documents;
 where every pair of the number of the documents does not have one or more of the topics in common, creating multiple nodes within the learning tree for different groups of the number of the documents that each have one or more of the topics in common;
 removing the number of documents from the document pool; and
 where the document pool remains not empty,
  for the single node or each of the multiple nodes that has been most recently created, selecting the documents within the pool that have one or more of the topics in common therewith and clustering the documents that have been selected into a plurality of clusters; and
  for each cluster, setting the documents thereof as the number of the documents and repeating the method at the entry point.

* * * * *